United States Patent [19]

Dangayach

[11] Patent Number: 5,994,451
[45] Date of Patent: Nov. 30, 1999

[54] POLYTRIMETHYLENE TEREPHTHALATE COMPOSITION

[75] Inventor: Kailash Dangayach, Houston, Tex.

[73] Assignee: Shell Oil Company, Houston, Tex.

[21] Appl. No.: 09/066,156

[22] Filed: Apr. 24, 1998

[51] Int. Cl.⁶ ...................................................... C08L 67/02
[52] U.S. Cl. ............................ 524/539; 525/437; 525/445
[58] Field of Search .................................... 525/445, 437; 524/539

[56] References Cited

U.S. PATENT DOCUMENTS

| | | | |
|---|---|---|---|
| 4,857,605 | 8/1989 | Lutz | 525/445 |
| 5,326,806 | 7/1994 | Yokoshima et al. | 524/411 |

*Primary Examiner*—Patricia A. Short

[57] ABSTRACT

A polytrimethylene terephthalate composition containing about 0.1 to about 5 wt % of a polyketone can be injection molded at a low temperature and rapid molding time.

13 Claims, No Drawings

POLYTRIMETHYLENE TEREPHTHALATE COMPOSITION

BACKGROUND OF THE INVENTION

This invention relates to polytrimethylene terephthalate compositions. In one aspect, the invention relates to improved polytrimethylene terephthalate engineering thermoplastic compositions.

Polytrimethylene terephthalate (PTT) is known to be useful as an engineering thermoplastic for injection molding applications, as described in U.S. Pat. No. 5,326,806. The ideal engineering thermoplastic can be molded at low temperature and in short cycle times without sacrificing mechanical properties. Although molded PTT parts have excellent properties, the molding time for PTT is longer and the mold temperature higher than desired for an efficient commercial process.

It is therefore an object of the invention to provide a modified PTT composition. It is a further object to reduce the processing time for PTT molding compounds.

SUMMARY OF THE INVENTION

According to the invention, a polytrimethylene terephthalate polymer is blended with a minor amount of a polyketone to produce a molding compound having improved modulus and strength and significantly lower mold processing time and temperature than unmodified PTT.

DETAILED DESCRIPTION OF THE INVENTION

The composition of the invention includes a 1,3-propanediol-based aromatic polyester. As used herein, "1,3-propanediol-based aromatic polyester" refers to a polyester prepared by the condensation polymerization reaction of one or more diols with one or more aromatic diacids (or alkyl esters thereof) in which at least about 60, preferably at least about 80, mole percent of the diol(s) is 1,3-propanediol. "Polytrimethylene terephthalate" ("PTT") refers to such a polyester in which at least about 80 mole percent of the diacid(s) is terephthalic acid (or alkyl ester thereof). Other diols which may be copolymerized in such a PTT polyester include, for example, ethylene glycol, diethylene glycol, 1,4-cyclohexane dimethanol, bis(3-hydroxypropyl)ether and 1,4-butanediol. Other aromatic and aliphatic acids which may be copolymerized include, for example, isophthalic acid and 2,6-naphthalene dicarboxylic acid. The condensation polymerization of PTT usually generates as much as about four mole percent of bis(3-hydroxypropyl) ether which, in effect, becomes a comonomer and is incorporated into the polyester chain.

PTT can be prepared by reacting 1,3-propanediol and an aromatic diacid (or alkyl ester thereof), with removal of byproduct water (or alcohol), for a time effective to produce a polyester having an intrinsic viscosity as measured in hexafluoroisopropanol of at least about 0.8. In one variation on this process, a 1,3-propanediol-based polyester such as polytrimethylene terephthalate can be prepared in a two-stage condensation polymerization process. The first stage, melt polycondensation, includes two steps, a "pressure step" followed by a "vacuum step." In the pressure step, a molar excess of at least one diol is reacted with at least one diacid (or alkyl ester thereof), usually in the absence of added catalyst in the case of diacid reactions, at a temperature within the range of about 230 to about 300° C., preferably about 240 to about 270° C., under elevated pressure, preferably under nitrogen gas, within the range of about 20 to about 200 psi, preferably about 50 psi. Water is produced as a byproduct and is removed by suitable means such as overhead distillation. The polymerization conditions are selected so as to produce a relatively low molecular weight polyester having an intrinsic viscosity (i.v.) (as measured at room temperature in a 50/50 mixture of trifluoroacetic acid and methylene chloride) of less than about 0.3, usually within the range of about 0.05 to about 0.25.

For the vacuum step of the melt polycondensation stage, the pressure on the reaction mixture is reduced and a catalyst is added. The preferred polycondensation catalysts are compounds of titanium or tin, such as titanium butoxide, present in an amount within the range of about 10 to about 400 ppm titanium or tin, based on the weight of the polymer. The low molecular weight product of the first step is heated at a temperature within the range of about 240 to about 300° C. under less than atmospheric pressure for a time effective to increase the intrinsic viscosity of the starting material to at least about 0.5. During the reaction, additional water is produced as a by-product and is removed overhead along with the excess diol.

The molten product of the melt stage is cooled, solidified and optionally formed into pellets. The polymer can then be polycondensed in solid form ("solid-stated") at an elevated temperature less than the target polymer melt point, generally (for polytrimethylene terephthalate) a temperature greater than about 180° C., preferably above about 200° C., under reduced pressure and/or an inert gas stream. The solid-stating phase is carried out for a time, generally about 4 hours or more, sufficient to produce a polyester having an intrinsic viscosity of at least about 0.8, generally within the range of about 0.9 to about 1.5 for engineering thermoplastic applications.

The invention composition is prepared by incorporating a minor amount of a polyketone into a polytrimethylene terephthalate polymer. As used herein, "polyketone" refers to a linear alternating polymer of carbon monoxide and an ethylenically unsaturated hydrocarbon, such as polymers of carbon monoxide and ethylene, ethylene-propylene, propylene, butylene and higher alkylenes and combinations thereof. Such polymers can be represented by the generic formula

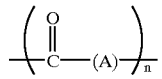

where A is the product of polymerizing an ethylenically unsaturated hydrocarbon through the ethylenic unsaturation.

The polyketone can be added to the starting monomer mixture, to the intermediate mixture during polymerization or, preferably, to the polymer product of polymerization. Incorporation into the finished polymer can be effected by suitable means such as dry blending or melt blending. The preferred blending technique is melt-blending the polyketone with PTT in a single- or twin-screw extruder at a polymer temperature within the range of about 240° to about 270° C.. The blend can be passed directly to molding or can be solidified and divided into pellets for later use. Polyketones can be unstable at high temperatures and under shear, so temperatures of the blend should be maintained below abut 265° C. during all processing. Prior to any processing, the blend should be dried to less than about 100 ppm water.

The polyketone is added to the PTT in an amount within the range of about 0.1 to about 5, preferably about 0.5 to about 2 wt %, based on the weight of the PTT. The polyketone is preferably in small-particle form. Suitable polyketones are available as Carilon™ polyketones from Shell Chemical Company. Preferred polyketones are prepared from ethylene and have an intrinsic viscosity within the range of 1.5 to 2.2 (measured in m-cresol at 60° C.).

The PTT compositions of the invention are useful in fiber, film and molding applications. It has been found that the polyketone-containing PTT compositions exhibit excellent properties for application in engineering thermoplastics.

The PTT molding compounds can contain other ingredients such as $TiO_2$, fillers, glass fibers, phenolic compounds and the like depending on the properties desired in the molded part. When reinforcement is desired for enhancement of HDT and greater structural rigidity, glass fibers are preferred as the reinforcing material and are present in an amount within the range of about 15 to about 50 wt %, based on the total weight of the composition.

The modified PTT can be blended with other polymer(s), including polyethylene terephthalate, polybutylene terephthalate, polycyclohexanedimethylene terephthalate, polypropylene and polyphenylene sulfide, for tailoring the properties of the final composition.

The injection molding process for the invention compositions involves heating the PTT/polyketone blend to a melting temperature within the range of about 265 to about 270° C., injecting the molten blend into a mold cavity maintained at a temperature (for neat blends) between room temperature and about 90° C., and (for glass-reinforced blends) between about 60 to about 90° C., and removing the molded article from the mold after a time of about 12 to about 25 seconds.

EXAMPLE 1

Properties of Polyketone-Modified PTT Molding Compounds

PTT and aliphatic polyketone polymers were dry blended in 20 lb. batches at weight ratios of 100/0, 99/1, 95/1, 90/10, 75/25, 50/50, 25/75, 10/90, 5/95, 1/99, and 0/100. Each batch was then compounded in a co-rotating twin screw extruder. Screw speed was maintained at a moderate 150–200 RPM to prevent polymer degradation. Typical barrel temperatures were 220–230° C., resulting in a melt temperature of about 235° C. Strands were pulled through a water bath maintained at 30–40° C. and fed to a pelletizer. Prior to molding, blends were dried for at least 16 hours at 115° C. under 25 Hg pressure with a dried nitrogen flow of 10 SCFH.

Each PTT/polyketone blend was evaluated neat and with fiberglass reinforcement. Glass feeding equipment was mounted approximately ⅔ down the barrel to feed glass fibers to the blend. The resulting melt temperature was about 265° C. due to increased shear from the fiberglass.

Both neat and glass-filled blends were molded in an injection molding machine using an ASTM family mold. Barrel/nozzle temperatures ranged from 235–275° C.. Injection pressures were from 600–1000 psi with holding pressures from 200–775 psi. Mold temperatures varied from 70–190° F. (unreinforced) and 140–190° F. (reinforced). Minimum cycle times were about 15–20 seconds for unreinforced and reinforced blends.

Each blend was tested using ASTM methods. Test results are summarized in Tables 1 and 2. As can be seen from the results, the addition of a minor amount of polyketone to the PTT reduces mold cycle time by at least half and significantly reduces mold temperature (for neat resin, to about room temperature).

TABLE 1

UNREINFORCED PTT/POLYKETONE BLENDS

| | Break | Tensile | | Notched Izod | HDT | | Minimum |
|---|---|---|---|---|---|---|---|
| % Polyketone[1] | Stress ksi | Modulus ksi | Elong. % | RT ft 1.b/in | @ 264 psi °C. | Total Cycle Time Sec. | Mold Temp °F. |
| 0 | 8.5 | 367 | 11.3 | 0.5 | 57 | 53 | 190 |
| 1 | 8.7 | 386 | 5.7 | 0.53 | 58 | 17 | 190 |
| 5 | 8.7 | 386 | 5.7 | 0.54 | 61 | 18 | 190 |
| 10 | 8.3 | 369 | 4.3 | 0.55 | 64 | 15 | 190 |
| 25 | 6.9 | 346 | 2.6 | 0.53 | 64 | 15 | 190 |
| 50 | 6.7 | 320 | 4.5 | 0.5 | 58 | 18 | 70 |
| 75 | 9.3 | 278 | 134 | 2.74 | 71 | 16 | 70 |
| 90 | 11.2 | 232 | 243 | 3.7 | 93 | 18 | 120 |
| 95 | 9.8 | 216 | 180 | 4.42 | 94 | 18 | 70 |
| 100 | 11 | 233 | 250 | 4.79 | 83 | 16 | 70 |

[1]Carilon ™ polyketone (1.8 LVN) from Shell Chemical Company.

TABLE 2

REINFORCED PTT/POLYKETONE BLENDS

| % Polyketone[1] | % Glass | Break Stress ksi | Tensile Modulus ksi | Elong. % | Notched Izod RT ft 1.b/in | HDT @ 264 psi °C. | Total Cycle Time Sec. | Minimum Mold Temp °F. |
|---|---|---|---|---|---|---|---|---|
| 0  | 31.0 | 23.00 | 1521 | 2.54 | 1.83 | 210 | 33 | 190 |
| 1  | 30.0 | 20.96 | 1554 | 2.18 | 1.46 | 199 | 23 | 190 |
| 5  | 27.3 | 22.05 | 1322 | 2.38 | 1.48 | 208 | 18 | 140 |
| 10 | 29.8 | 21.29 | 1430 | 2.45 | 1.61 | 209 | 19 | 140 |
| 25 | 28.9 | 19.27 | 1339 | 2.35 | 1.67 | 208 | 18 | 140 |
| 50 | 34.8 | 16.57 | 1379 | 1.67 | 1.76 | 213 | 20 | 140 |
| 75 | 29.2 | 16.36 | 1100 | 2.35 | 1.93 | 215 | 18 | 140 |
| 90 | 39.5 | 17.85 | 1399 | 2.12 | 2.31 | 216 | 18 | 140 |

[1]Carilon ™ Polyketone (1.8 LVN) from Shell Chemical Company.

I claim:

1. A composition comprising:
   (a) a 1,3-propanediol-based aromatic polyester and
   (b) about 0.1 to about 5 wt %, based on the weight of said polyester, of a linear aliphatic polyketone.

2. The composition of claim 1 in which the 1,3-propanediol-based aromatic polyester is derived from one or more diols in which at least about 60 mole percent is 1,3-propanediol and from one or more aromatic diacids or alkyl esters thereof in which at least about 80 mole percent is terephthalic acid or alky ester thereof.

3. The composition of claim 1 in which the 1,3-propanediol-based aromatic polyester is derived from one or more diols in which at least about 80 mole percent is 1,3-propanediol and one or more aromatic diacids in which at least about 80 mole percent is terephthalic acid.

4. The composition of claim 3 in which the polyketone is present in an amount within the range of about 0.5 to about 2 wt %, based on the weight of the polyester.

5. The composition of claim 1 further comprising from about 15 to about 50 wt %, based on the total weight of the composition, of a fibrous reinforcing agent.

6. The composition of claim 1 in which the 1,3-propanediol-based polyester is polytrimethylene terephthalate.

7. The composition of claim 6 in which the polyketone is present in an amount within the range of about 0.5 to about 2 wt %, based on the weight of the polyester.

8. The composition of claim 6 which further comprises a fibrous reinforcing agent.

9. The composition of claim 8 in which the fibrous reinforcing agent is glass.

10. The composition of claim 1 in which the linear aliphatic polyketone is a linear alternating polymer of carbon monoxide and ethylene.

11. A method for reducing the mold cycle time of a 1,3-propanediol-based polyester comprising melt-blending into said polyester from about 0.1 to about 5.0 wt %, based on the weight of said polyester, of a linear aliphatic polyketone.

12. The method of claim 11 in which the linear aliphatic polyketone is blended into the polyester in an amount within the range of about 0.5 to about 2 wt %, based on the weight of the polyester.

13. The method of claim 11 in which the mold cycle time of the polyketone-containing polyester is less than about 20 seconds.

* * * * *